United States Patent

Pearne et al.

[15] 3,656,634
[45] Apr. 18, 1972

[54] BRICK HANDLING AND STACKING MACHINE

[72] Inventors: Frank S. Pearne, San Gabriel; Florentin J. Pearne, Whittier, both of Calif.

[73] Assignee: Aircraft Mechanics, Inc., Los Angeles, Calif.

[22] Filed: Dec. 4, 1970

[21] Appl. No.: 95,157

[52] U.S. Cl............................214/6 A, 214/8.5 C, 214/10.5 R
[51] Int. Cl.................................................B65g 57/26
[58] Field of Search..............214/6 A, 6 M, 6 FS, 6 N, 8.5 C, 214/8.5 D; 294/62, 63 A, 63 R; 25/2, 142 M

[56] References Cited

UNITED STATES PATENTS

| | | | |
|---|---|---|---|
| 2,990,069 | 6/1961 | Repasky et al. | 25/2 X |
| 3,384,939 | 5/1968 | Baker | 25/2 |
| 3,474,917 | 10/1969 | Pearne et al. | 25/2 X |
| 3,487,959 | 1/1970 | Pearne et al. | 214/8.5 C |
| 3,571,866 | 3/1971 | Brown, Jr. | 214/6 A |

Primary Examiner—Gerald M. Forlenza
Assistant Examiner—Robert J. Spar
Attorney—McNenny, Farrington, Pearne & Gordon

[57] ABSTRACT

A machine for handling bricks or the like is disclosed. The machine functions to grip grids including a plurality of spaced and parallel double lines of brick located within stacks on a kiln car and to position such grids on first conveyor means. These conveyor means deliver the grids to a spreader which spreads the grids into double rows with one brick resting upon another. An inverter transfer grips the upper rows and transfers them in their spread condition to a laterally spaced location. The separated or spread rows are then delivered by second conveyor means to a stacker which operates to simultaneously form a stack on a stacking elevator corresponding to each row. The stacks are then moved out of the stacker for subsequent processing leaving the stacker free for subsequent stacking. Each subassembly simultaneously handles a number of brick substantially equal to the number of brick in a grid thereby providing high machine outputs with relatively slow subassembly cyclic rates.

16 Claims, 11 Drawing Figures

PATENTED APR 18 1972

INVENTORS
FRANK S. PEARNE
& FLORENTIN J. PEARNE
BY
McNENNY, FARRINGTON, PEARNE & GORDON

ATTORNEYS

INVENTORS
FRANK S. PEARNE,
& FLORENTIN J. PEARNE
BY
McNENNY, FARRINGTON, PEARNE & GORDON
ATTORNEYS

BRICK HANDLING AND STACKING MACHINE

BACKGROUND OF THE INVENTION

This invention relates generally to the manufacture of bricks, and more particularly to a novel and improved apparatus for unloading kiln cars or the like and blending and stacking bricks so that the stacks may be tied and formed in packs for easy handling, storage, and shipment.

PRIOR ART

Various types of machines have been used to automate the manufacture of bricks. With such machines labor costs are reduced and product quality is usually improved. For example, the U.S. Pat. No. 3,478,397 discloses a brick cutter and hacker which automatically forms the individual bricks and stacks the bricks in grids on a kiln car or the like. Such grids include a plurality of spaced and parallel double lines of endwise abutting brick wherein each line consists of pairs of brick positioned one on top of the other. Such grids are arranged to permit proper drying and firing of the individual brick within the stack. The U.S. Pat. No. 3,478,896 discloses an apparatus for stacking grids so that predetermined grids provide tying to stabilize the stack.

The U.S. Pat. No. 3,487,959 discloses an automated unloading apparatus for sequentially removing the grids from the stacks on the kiln car after the bricks are fired and for transferring such bricks to a stacker.

The U.S. Pat. Nos. 3,392,851 and 3,491,901 both disclose machines for stacking bricks in stacks suitable for strapping. In each of these machines bricks delivered to the stacker by a conveyor are gripped as groups or rows and are transferred progressively to a stacker platform which is lowered as the groups or rows of brick are stacked thereon until a desired stack is completed. Such stacks are then transferred to a strapper which ties the stacks into packs which are particularly suited for convenient storage, handling, and shipping of the bricks. All of the above mentioned patents are assigned to the assignee of the present invention.

SUMMARY OF THE INVENTION

The present invention is directed to a simplified method and apparatus for unloading grids of brick or the like from stacks of grids and for forming such bricks into stacks suitable for strapping. The apparatus includes an unloader gripper for sequentially gripping grids at the stacks and transferring the grids to conveyor means wherein the bricks are arranged in a plurality of rows extending lengthwise along a conveyor system. The rows are spaced apart as they move along the conveyor system to a stacker. The stacker includes a vertically movable stacking platform and a stacker gripper assembly adapted to simultaneously grip a plurality of groups of brick on the conveyor system and transfer the groups to the stacker platform to simultaneously form a plurality of stacks on the stacker platform. After the stacks are fully formed, means are provided to transport the stacks to a subsequent processing system such as a strapper or the like.

In the illustrated embodiment, the grids are provided with a plurality of spaced and parallel double lines of endwise abutting brick wherein each line consists of pairs of brick positioned one on top of the other. A gripper transfer is provided which moves the spaced parallel double lines into abutting relationship and transfers such grids to spreader means. The spreader means separate the bricks into spaced and parallel double rows in which the rows consist of side face abutting bricks and the rows are endwise spaced apart. Each double row includes pairs of brick with one resting on top of the other. In the illustrated embodiment inverter means are provided to grip the upper bricks of each grid and simultaneously transfer the upper bricks to a separate conveyor while maintaining the spacing between the rows. With this arrangement a single spreader functions to spread both the upper and lower bricks of each grid and the inverter functions to invert and transfer the upper bricks of the grid while they remain in a spread condition.

The two conveyors operate to transport the rows of brick to the stacker in proper position for gripping by a simplified stacker carriage which grips the rows of brick and removes them from the conveyor positioning the rows over the stacker platform where they are released to simultaneously produce a plurality of stacks.

Improved separator sheets are provided in which a single separator sheet is positioned over a plurality of stacks while the stacks are in a spaced condition. Subsequently, when the stacks are pushed together the separator sheets fold between the ends of adjacent rows providing improved brick alignment and protection of the ends of the brick within the stack. The elevator platform of the stacker is arranged so that all of the stacks are simultaneously removed from the stacker clearing the stacker for subsequent operation. A pusher assembly functions to thereafter push the stacks to the subsequent processing machinery such as a strapper.

This illustrated embodiment combines a number of sequential handling operations, each of which operates through a cycle of operation in which a large number of bricks are simultaneously processed. Therefore, high machine outputs are obtained without requiring the various processing subassemblies to operate at high cyclic rates.

In the illustrated embodiment an entire grid of 80 bricks is simultaneously gripped and transferred during each operation of the gripper transfer. Similarly, the spreader inverter handles an entire grid during each of its operating cycles. Similarly, the stacker subsystem handles an entire grid during each stacking cycle. In fact, in the illustrated embodiment, the stacker carriage operates to grip and transfer up to 88 bricks during each stacker carriage cycle.

In each instance each subsystem is capable of handling at least as many bricks during each cycle as the preceding subsystem so the maximum cyclic rate required of each subsystem is no greater than the cyclic rate of the first subsystem.

With the illustrated machine high hourly outputs can be obtained even though the machine is not fully automated, but rather utilizes certain manually controlled operations. A semiautomatic machine of this type is much simpler in structure, less expensive to manufacture, and does not require as much uniformly in the positioning of the individual bricks in the stacks of grids since the operator can modify operations to some extent to compensate for variations. On the other hand, a machine system incorporating the broader aspects of this invention may be fully automated and such fully automated machine includes subsystems which need not operate at high cyclic rates even when high machine outputs are obtained.

With the illustrated machine the bricks are also very well blended since only one row from a given grid is positioned in a given stack. Consequently, each stack is formed of a plurality of rows wherein each row is from a different grid. Automatic blending is therefore achieved.

BRIEF DESCRIPTION OF THE DRAWINGS

FIG. 1 is a perspective view of an entire machine system incorporating the present invention which is operable to semiautomatically process the bricks providing all of the necessary handling operations from the step of removing the fired bricks from the kiln car to the feeding of stacks to a strapper or the like;

FIG. 4 is a perspective view of the pusher which receives the stacks from the stacker and pushes the stacks into a strapper or the like.

DETAILED DESCRIPTION OF THE DRAWINGS

Figure 1:
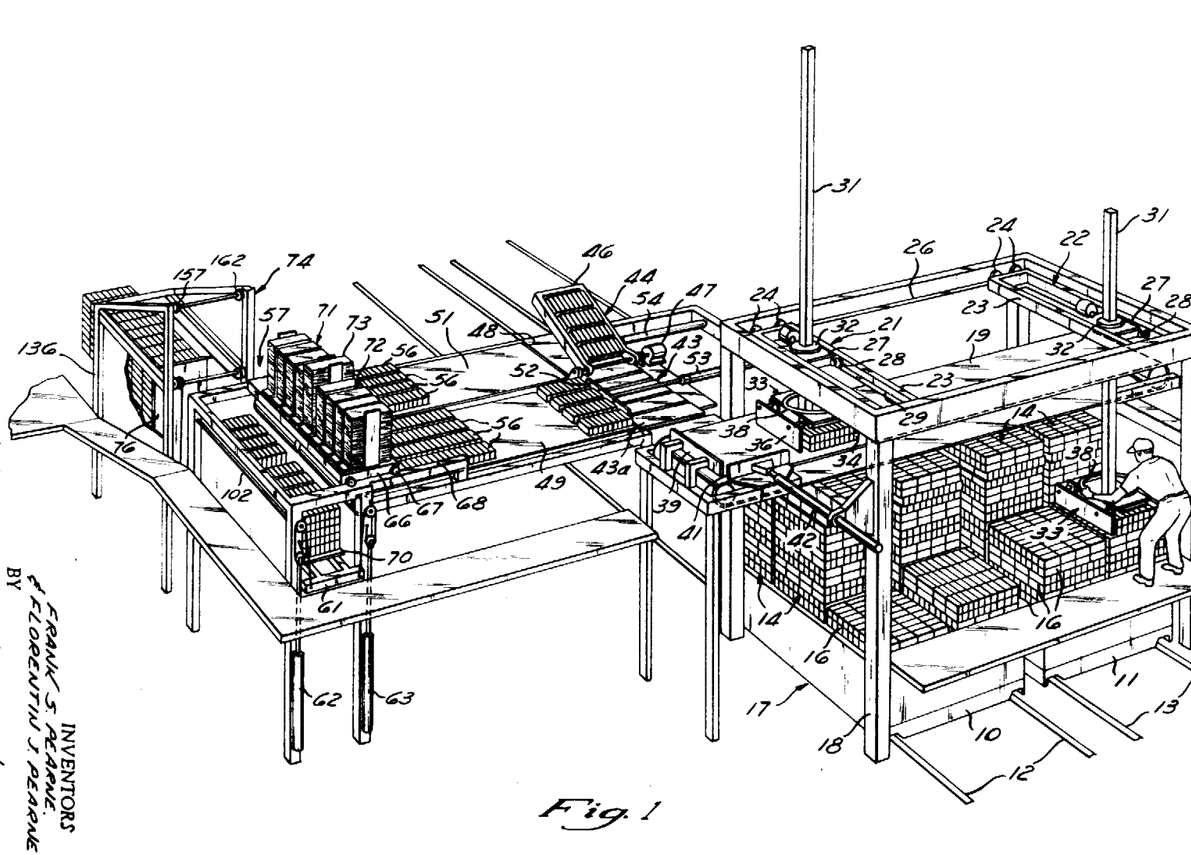

FIG. 1 schematically illustrates one physical arrangement of an unloader stacker in accordance with this invention. The bricks are delivered to the machine on kiln cars 10 and 11 which are movable to the machine along tracks 12 and 13, respectively. Each car is loaded with a plurality of stacks 14 of fired bricks. In the illustrated embodiment each stack originally includes six grids 16 of 80 bricks, each arranged in 10 double lines, four bricks long. The double lines include four pairs of endwise abutting brick with one brick resting on the other. Since there are eight bricks in each line and ten lines in each grid, each grid includes 80 bricks.

In practice the lines are laterally spaced from each other and are parallel to each other, although the spacing is not illustrated in FIG. 1 because of the scale of the drawing. Reference, however, may be made to the U.S. Pat. Nos. 3,478,397 and 3,478,896 for a more detailed description of the spacing of the lines of brick in such grids.

It should be understood that grids may be formed with greater or lesser numbers of lines and that the lines may include greater or lesser numbers of brick. The grids illustrated in FIG. 1 are merely representative of one size of grid which may be conveniently unloaded in accordance with the present invention. Further, in the illustrated embodiment, each car 10 and 11 is initially loaded with six stacks of grids. However, the cars can be loaded with greater or lesser numbers of stacks depending upon the size of the cars and the size of the grids.

The cars 10 and 11 are illustrated in an unloading position 17 within a machine frame 18 which supports a belt-type unloader conveyor 19 and two similar gripper transfer assemblies 21 and 22. The gripper transfer assembly 21 is illustrated in its delivery position in which a grid 16 is positioned on the conveyor 19 while the gripper transfer assembly 22 is illustrated in the pickup position in which it first grips a grid 16. Since the two gripper transfer assemblies are identical in structure, only one need be described in detail.

Each gripper transfer assembly 21 and 22 includes a carriage 23 supported by end rollers 24 for movement along tracks 26 in the frame 18 in a direction parallel to the conveyor 19. Supported on each carriage 23 is a secondary carriage 27 provided with rollers 28 which support the secondary carriage 27 for lateral movement with respect to the conveyor 19 along rails 29 provided by the associated carriage 23. Therefore, each secondary carriage is movable in a direction in alignment with the conveyor 19 as the associated carriage 23 moves in this direction and is laterally movable with respect to the conveyor by lateral movement with respect to its associated carriage 23.

Mounted on each secondary carriage is a vertically movable mast 31 which is guided in bearing means 32 for vertical movement with respect to the associated secondary carriage. Supported at the lower end of each mast 31 is a gripper assembly 33 provided with opposed gripper plates 34 and 36 which are movable toward each other to provide gripping of a grid, and away from each other to provide for the release of a grid.

The mounting structure is arranged to permit rotation of the gripper assembly 33 through 90° so that the assembly can be positioned to grip the grids.

Each of the gripper transfer assemblies is provided with power operation. For example, hydraulic or pneumatic piston and cylinder actuators are connected between the various subassemblies to control the movement. These actuators, for the most part, are not illustrated for purposes of simplification. However, reference may be made to the U.S. Pat. No. 3,478,397 which illustrates one arrangement of power actuators which may be utilized. Normally, power actuators are not provided between each of the main carriages 21 and 22 and the frame, since manual movement in the direction accommodated by these carriages is easily provided and it is not necessary to move the carriages lengthwise of the conveyor to any particular location for delivery to the conveyor. However, a power actuator is normally connected between the secondary carriages 27 and their associated main carriages 21 or 22. Similarly, power actuators are provided to control the raising and lowering of the mast. The rotation of the gripper assembly 33 is provided by actuators. Also, the gripping and releasing movement of the gripper plates 34 and 36 is power-controlled by actuators.

A control wheel 38 is mounted on the top of each gripper assembly 33 and is connected through suitable control valves to the various actuators of the associated gripper assembly. These control wheels 38 are gripped by an operator as illustrated and moved in such a manner as to cause proper positioning of the gripper assembly 33 for gripping of the desired grid 16. Once gripping has occurred, the various actuators are automatically programmed to raise the associated mast 31 to a level above the conveyor 19 to move the secondary carriage 27 to a proper position over the conveyor 19 and, if necessary, rotate the gripper so that the bricks of the grid supported by the gripper assembly 33 extend perpendicular to the lengthwise direction of the conveyor. When the grid is properly positioned over the conveyor, it is released onto the conveyor and the power actuators are automatically programmed to move the gripper assembly back to a position clear of the conveyor 19 over one of the stacks in the unloading position. At this time the operator again takes control and by use of the control wheel 38 positions the gripper assembly for gripping of a subsequent grid.

In the illustrated embodiment the grids are gripped against the lateral faces of the outside lines and the lines are caused to move together into a compact engagement as the gripper plates move toward each other. Once they are compacted the gripper plates firmly grip the entire grid by gripping the outside lateral faces of the bricks of the grid. The grids are then carried to a position over the conveyor and are turned if necessary to position the lines in a direction perpendicular to lengthwise direction of the conveyor. When properly positioned over the conveyor, the grippers release to deposit the grids on the conveyor 19. If desired the ends of the line may be gripped during transfer to the conveyor. In such an arrangement, the lines of brick are not moved together during gripping. However, the conveyor 19 operates to compact the lines against a stop 39.

After the grids are positioned on the conveyor 19, it is operated by its power actuator (not illustrated) to carry the grids to a position against an end stop 39 located at one end of the conveyor 19. A pusher plate 41 operated by a piston and cylinder actuator 42 then engages the ends of the lines of a grid positioned against the stop 39 and pushes the grid laterally off the conveyor 19 onto a spreader table 43. The spreader table 43 is provided with four spreader bars 43a positioned and sized to receive one pair of brick in each line of the grid.

The spreader table 43 operates to spread the double rows of laterally abutting bricks providing endwise separation between the bricks in each line of the grid. This occurs while the grids remain in double rows consisting of pairs of brick supported one on the other. An inverter transfer 44 includes a gripper frame 46 which is pivotally rotated by a rotary actuator 47 between a gripping position over the spreader table 43 and a release position over a table 48 laterally spaced from the spreader table 43. The gripper inverter is operable to grip the upper four rows of brick of each grid supported by the spreader table after the rows have been spread and to invert such upper bricks and position them on the table 48 in the spread condition. With this combined structure, a single spreader table having only four spreader bars 43a operates to spread both the upper and lower bricks in the rows thus eliminating the need of additional spreader means. In some instances where inverting is not desired, a gripper transfer is substituted which is operable to transfer the upper rows of brick to the table 48 without inversion. However, normally inverting during transfer is desired.

Positioned in alignment with the spreader table 43 is a first belt conveyor 49 and in alignment with the table 48 is a second belt conveyor 51. A pusher plate 52 aligned with the spreader table 43 is operated by an actuator 53 to push the spread rows consisting of the lower bricks of a grid off the spreader table onto the conveyor 49 after the upper bricks are removed. Similarly, a pusher aligned with the table 48 and operated by an actuator 54 operates to push the spread rows of upper brick from the table 48 onto the conveyor 51 after they are deposited thereon by the inverter 44 and the inverter 44 is raised to clear such brick.

The two conveyors 49 and 51 are parallel to each other and operate to each carry four spread rows 56 of brick to a stacker subassembly 57.

Located at the stacker subassembly is a stacker platform 61 which is powered for vertical movement by a pair of piston and cylinder actuators 62 and 63. The platform is positioned adjacent to the delivery end of the two conveyors 49 and 51 and is sufficiently long to accommodate eight separate stacks with one aligned with each of the eight separate rows 56 on the two conveyors. Also located at the stacker subassembly is a stacker carriage 66 supported on rollers 67 for movement along rails 68 between a gripping position over the ends of the conveyors 49 and 51 and a release position over the stacker platform 61. Mounted on the lower side of the carriage 66 are ten inflatable grippers 69 illustrated in FIGS. 3a and 3c which are arranged to grip the end surfaces of bricks within the eight rows 56 on the end of the conveyor. Each of the grippers is long enough so that it grips the end eleven bricks for supporting the bricks as the carriage 66 is moved to a position over the stacker elevator 61. Since eleven bricks are gripped in each row and there are eight rows, the carriage 66 is operable to transfer 88 bricks to the release position over the stacker platform 61 during each cycle of movement thereof.

Figures 3, 3A, 3B:
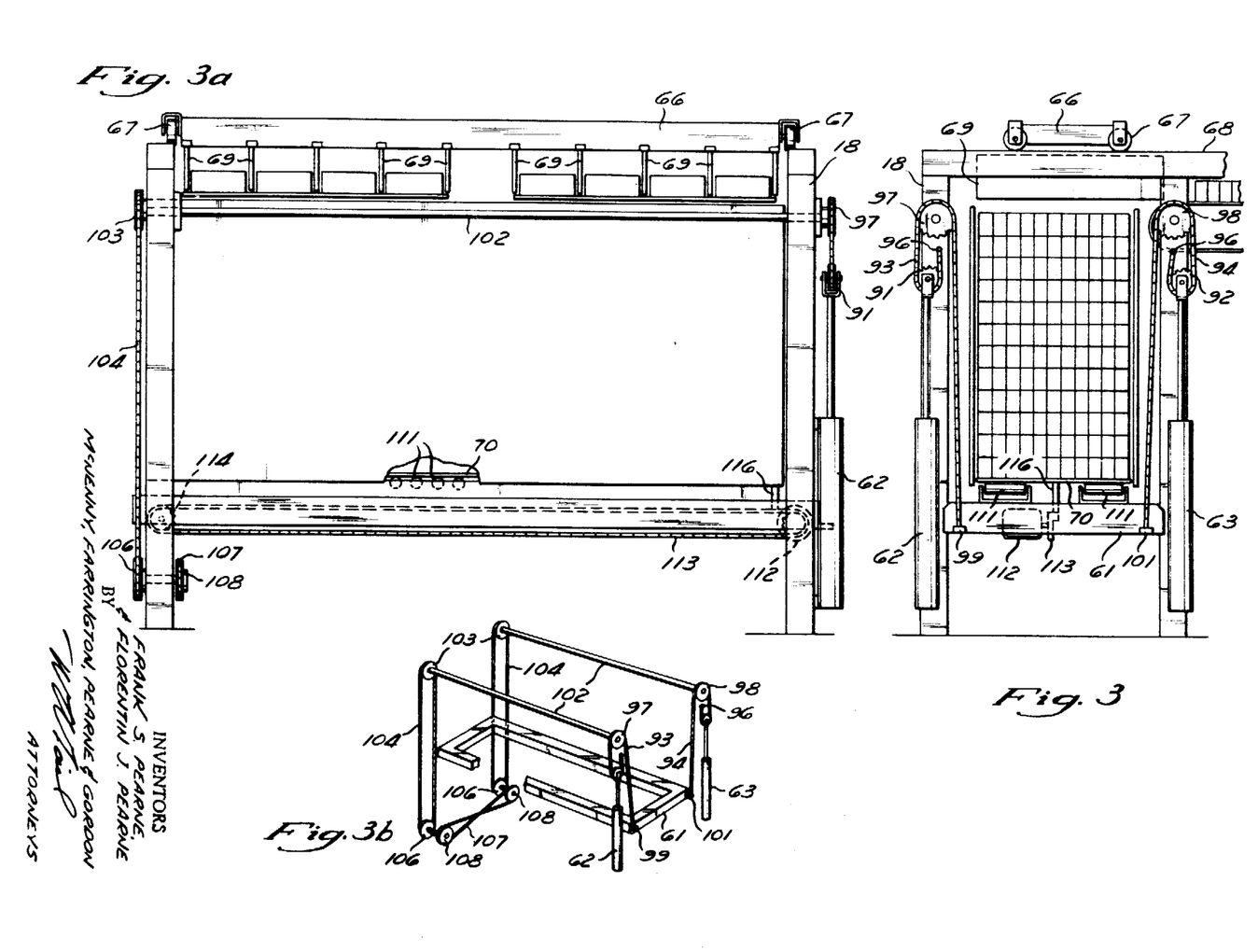
FIG. 3 is an end view of the stacker subsystem.
FIG. 3a is a side view of the stacker subsystem.
FIG. 3b is a schematic perspective view of the chain system for raising and lowering the elevator platform.

When the carriage is over the stacker platform 61 the grippers are deflated releasing the bricks thus placing eight rows of 11 bricks on the plate 70. The platform 61 and the plate 70 supported thereon are then lowered to position the top course of bricks thereon to receive a subsequent course of bricks from the stacker carriage. Such a cycle is repeated until 10 courses are placed on the stacker plate. Supported on the carriage above the grippers are two stacks of separator papers 71 and 72 and a stack of separator boards 73. In selected courses the operator moves the carriage to a position in which only six bricks are gripped for transfer to the stacker. After the groups of six brick are released onto the stacker, the operator rearranges the bricks to provide voids in the course into which the forks of a lift truck can be inserted for the handling of the final strapped stack. Separator boards from the stack 73 are positioned over such voids. Similarly, separator papers from the stack 71 and 72 are positioned between selected courses. The separator papers are discussed in more detail below.

The eight stacks are formed on a stacker plate 70 which is supported by the stacker platform. When all eight stacks are formed on the stacker plate, the stacker plate is moved horizontally to a strapper feed subassembly 74. The strapper feed subassembly is provided with a pusher 76 which moves down behind the stacks and holds the stacks against movement back to the stacker with the stacker plate. With this arrangement all eight stacks are simultaneously removed from the stacker clearing the stacker for subsequent stacking operations. The strapper feeder 74 then feeds the stacks to the strapper (not illustrated) which straps the stack into cubes permitting the convenient storing, handling, and shipping of the finished bricks.

Figure 2:
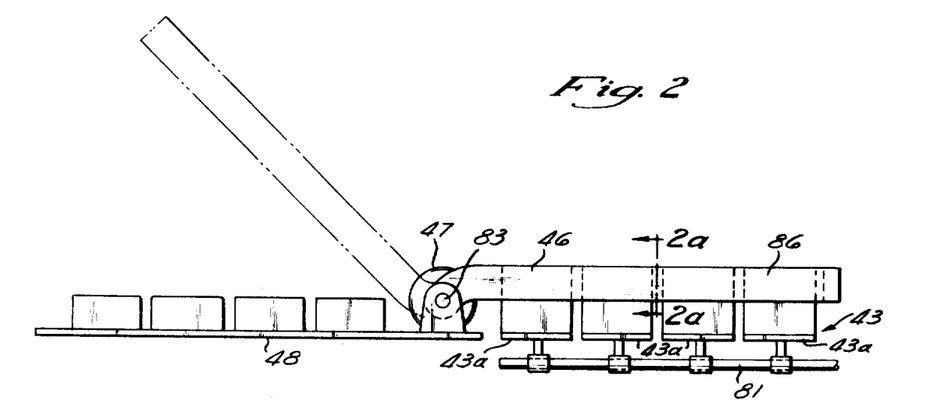
FIG. 2 is a schematic side elevation of the spreader inverter subsystem.
Figure 2A:
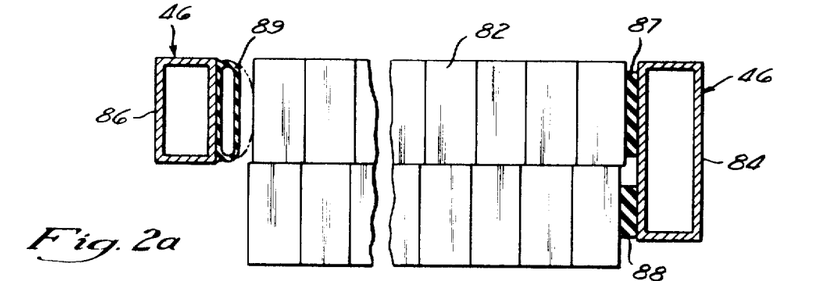
FIG. 2a is a fragmentary section taken along 2a-2a of FIG. 2 illustrating the gripper structure of the inverter.
Figure 2B:
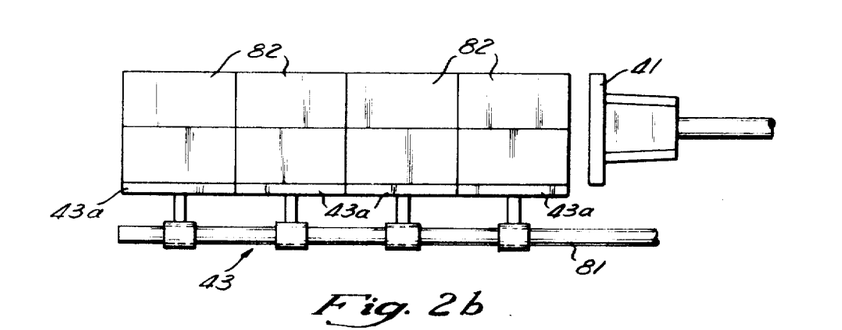
FIG. 2b is a fragmentary view of the spreader and the pusher which pushes the grids onto the spreader.

Reference should now be made to FIGS. 2, 2a, and 2b for a more complete understanding of the structure and operation of the spreader table 43 and the inverter 44. In the illustrated embodiment where each grid is provided with double lines of endwise abutting brick, four brick long and two brick high, the spreader table 43 is provided with four spreader bars 43a which are supported on lateral bars 81 for movement from the abutting condition illustrated in FIG. 2b to a spread condition as illustrated in FIG. 2. The spreader bars are proportioned so that one pair 82 in each line of the grid are supported on one of the bars 43a, when the grid is delivered to the spreader table by the pusher plate 41.

When the pairs of brick are properly supported, power means (not illustrated) separate the spreader bars 43a and the pairs of brick supported thereon to the spread condition of FIG. 2 in which the pairs of brick are spaced equally from the adjacent pairs. The gripper frame 46 is pivoted for rotation through an angle of 180° about a pivot axis 83 between a gripping position shown in full line, and a release position over the table 48. The actuator 47 powers the gripper frame for such rotation. The pivot axis is preferably in substantial horizontal alignment with the interface between the upper and lower bricks. Therefore when the inverter turns through 180°, the upper bricks are lowered and are released at the same level as the lower bricks.

The gripper frame 46 is provided with two spaced beams 84 and 86 proportioned to embrace the pairs of brick on the spreader bars when the frame is moved to the gripping position. The rearward beam 84 is provided with a gripper pad 87 positioned in alignment with the upper row of brick and a second pad 88 which is thicker than the pad 87, positioned in alignment with the lower bricks of the pairs. Mounted on the forward beam 86 is an inflatable tubular gripper 89 positioned in alignment with the ends of the rows of upper brick. When the gripper 89 is inflated it causes the upper bricks to be pressed laterally against the gripper pad 87. Since the lower bricks engage the pad 88 before final gripping, they are held against movement with the upper bricks. This insures that any bonds which may exist between the upper and lower bricks are broken due to the relative lateral shifting therebetween.

After the upper bricks are gripped the inverter frame is rotated through 180° to position the upper bricks, still in their spread condition, on the table 48. With this simple structure the gripping action is used to break bonds existing between upper and lower bricks in a given pair and to provide the necessary gripping for the inverter transfer operation.

Referring now to FIGS. 3, 3a, and 3b, the two actuators 62 and 63 are provided with sprockets 91 and 92 which respectively engage chains 93 and 94. Each of the chains is anchored at one end on the stacker frame 18 at 96 and extends down around the respective sprockets 91 and 92 and then up over sprockets 97 and 98 and down to their other ends where they are anchored at 99 and 101, respectively, on the stacker platform 61. When the two sprockets 91 and 92 are pulled downwardly the chains 93 and 94 cause the adjacent end of the elevator platform to be raised a distance equal to twice the downward movement of the sprockets 91 and 92. Therefore, the stroke of the two actuators 62 and 63 need be only equal to one-half of the required vertical travel of the elevator platform.

Referring to FIG. 3b, each of the sprockets 97 and 98 is mounted on an associated shaft 102 journalled on the frame 18 and provided with a second sprocket 103 at its opposite end. Therefore, the sprockets 91 and 92 rotate through the same angular distance as their associated sprockets 103. A chain 104 extends over each of the sprockets 103 and an idler sprocket 106. The adjacent corner of the platform 61 is connected to such chains. With this structure each of the actuators 62 and 63 provides the power for raising the associated side of the stacker platform 61. Synchronism between the two actuators is provided by a crossover chain 107 which extends around sprockets 108 associated with each sprocket 106 to insure that the four corners of the stacker platform are raised and lowered together. The stacker plate 70 on which the bricks are actually stacked is supported by rollers 111 on the stacker platform 61. Power for moving the stacker plate 70 from its stack receiving position on the stacker platform to the strapper feeder is provided by a rotary actuator 112 which drives a chain 113 which extends as a loop along the stacker platform 61 and around a sprocket 114. The upper reach of the chain 113 is connected by a projection 116 to one end of the stacker plate 70. Operation of the actuator in one direction moves the stacker plate into the stacker in position to receive the eight stacks of brick and operation of the actuator 112 in the opposite direction moves the stacker plate 70 along the rollers 111 to position the stacks in the strapper feeder.

Figures 3C, 3D:
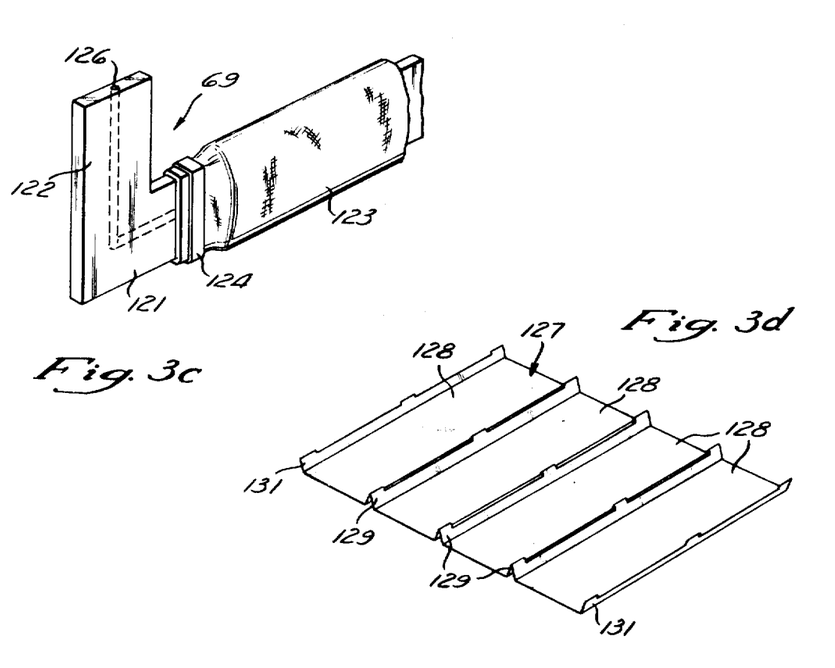
FIG. 3c is an enlarged fragmentary perspective view of the gripper structure utilized in the stacker subsystem.
FIG. 3d is an enlarged perspective view of the preferred separator sheets used in the stacker subsystem.

Referring to FIG. 3c, each of the grippers 69 on the stacker carriage 66 includes a horizontally extending bar 121 supported on its end by a mounting member 122 extending downwardly from the stacker carriage 66. Positioned around the bar 121 is an inflatable gripper tube 123 which is clamped at its ends 124 to the bar. Passage means 126 which extend down through one support 122 and along the bar 121 are open to the interior of the gripper tube 123. Valve pressure supply means (not illustrated) selectively inflate or deflate the grippers. When the grippers are deflated they are sufficiently narrow to move between the rows 56 with clearance and after inflation, they grip the ends of the bricks in the adjacent rows permitting such rows to be carried by the carriage over the stacker for stacking.

FIGS. 3c and 3d illustrate a separator sheet 127 of the type located in the two stacks 71 and 72. Each of these sheets 127 is provided with four flat sections 128 having a width equal to the length of the brick and intermediate folding portions 129 therebetween. Upstanding end portions 131 are provided at each end of the sheets.

Figure 3E:
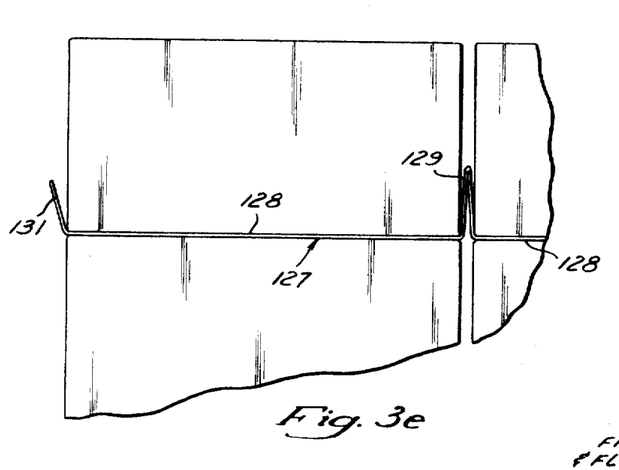
FIG. 3e is an enlarged fragmentary section illustrating the folding of the separator sheet when the stacks are pushed together.

When the stacks are formed on the stacker plate 70 they are spaced from each other a distance equal to the spacing between the rows 56. After a course is positioned in each stack a separator sheet may be positioned on top of the course. In the illustrated embodiment where eight stacks are formed, one separator sheet is positioned on one group of four stacks and another sheet is positioned on the other group of four stacks. When the separator sheets are positioned on the spaced stacks the folding section 121 has a width equal to the spacing between adjacent stacks. Subsequently when the stacks are removed from the plate by the strapper feeder, the stacks move together causing the folding sections 129 to collapse as illustrated in FIG. 3e and extend up in between the adjacent bricks in adjacent stacks. This folding action serves two functions. First, it tends to insure proper alignment between bricks in the rows and it also provides a protection between adjacent bricks which reduces the likelihood of damage thereof.

Figure 4:
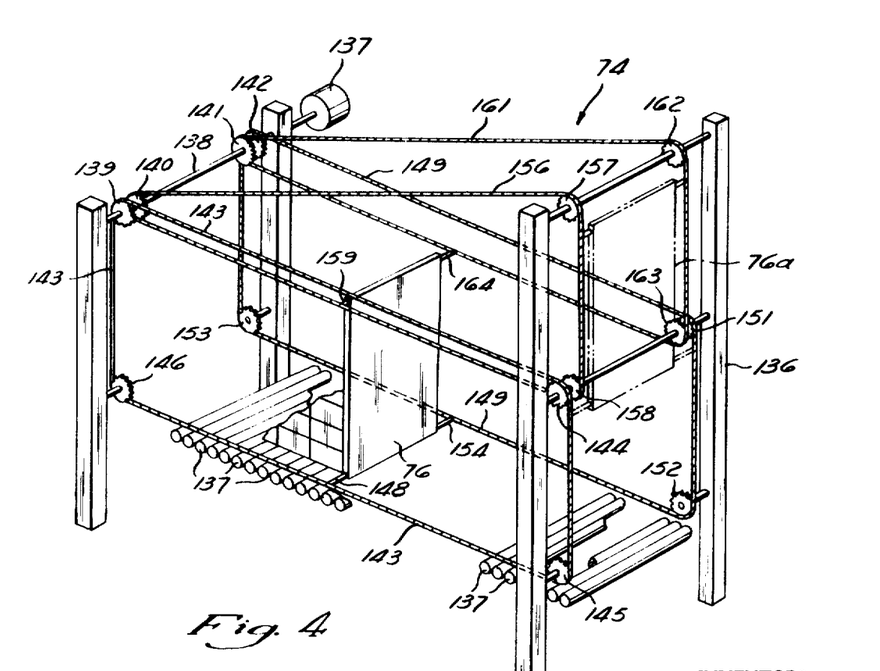

The structure of the strapper feeder 74 is best illustrated in FIG. 4. The strapper feeder is provided with a frame 136 on which is mounted a plurality of rollers 137 along which the stacker plate 70 moves and is supported as the bricks are carried into the strapper feeder and along which the stacks move after the stacker plate is pulled back out from underneath the stacks. The pusher plate 76 is movable vertically to a phantom line position at 76a in which it is spaced above the rollers 137 a sufficient distance to allow the eight stacks of brick to be moved along the rollers 137 by the stacker plate 70. After the stacks are pushed past the raised pusher, the pusher plate 76 is dropped down behind the stacks so that return of the stacker plate 70 to the stacker causes the rearward or adjacent stack to first engage the pusher and then progressively cause the remaining stacks to move into abutting engagement eliminating the spacing between adjacent stacks. Initially, the stacks are held against movement by the pusher while the plate 70 is removed and is returned to position for subsequent stacking. The pusher 76 is then movable horizontally toward a strapper or the like to progressively position the stacks in the strapper.

The control of movement of the pusher 76 is provided by a chain system driven by a single rotary actuator 137 which is connected to rotate a shaft 138. Four sprockets 139, 140, 141, and 142 are mounted on the shaft 138. The first sprocket 139 drives a chain loop 143 which extends around sprockets 139, 144, 145, and 146 and is connected at 148 to the lower left-hand corner of the pusher plate 76 as viewed in FIG. 4. A similar chain loop 149 is driven by the sprockets 142 and extends around sprockets 151, 152, and 153. This loop is connected to the lower right-hand corner of the pusher plate 76 as viewed in FIG. 4 at 154.

A first upper chain loop 156 is driven by the sprocket 140 and extends over sprockets 157 and 158. This chain loop is connected to the upper left-hand corner of the plate at 159. The second upper chain loop 161 is driven by the sprocket 141 and extends over sprockets 162 and 163. This chain loop is connected at 164 to the upper right-hand corner of the pusher plate. With this structure all of the chain loops provide lower reaches which extend horizontally and substantially parallel to each other and vertical reaches at one end. Consequently, the pusher plate is movable horizontally from one end of the frame to the other and is vertically movable at one end to the phantom position 76a. The various subassemblies are interconnected by suitable control means so that the pusher plate 76 is moved to the phantom position allowing eight completed stacks to move into the strapper feeder after which the plate 76 is dropped down behind the stacks allowing removal of the stacker plate 70. Subsequently, the actuator 137 is operated to progressively feed the stacks to the strapper or the like.

Because the gripper transfer grips a complete grid during each cycle of operation and delivers such grid to the conveyor 19, the cycle time required for such subassembly need not be short even though the output of such subassembly in number of bricks per hour is high. Consequently, it is practical to provide manual positioning of the gripper for gripping the grid. As pointed out previously, the subsequent movement of the grid to the conveyor is preferably automated including the indexing of 90° where necessary to insure that the bricks are released on the conveyor in the proper orientation.

Further, the spreader table and inverter combination operates to handle one complete grid during each cycle of operation. Therefore, this subsystem does not require rapid cyclic operation.

Since this stacker carriage functions to handle a number of bricks exceeding the number of bricks in a given grid, the cyclic time required for the stacking operation is even slower than the cyclic time of the gripper transfer. In the illustrated embodiment the movement of the stacker carriage is manually performed. However, this movement can be provided by a power actuator, if desired. Here again certain manual operations such as the positioning of the separator sheets and separator boards can be performed manually even through high machine outputs are achieved. Of course, such manual operations greatly simplify the required machine system structure. Since the stacker is cleared of all eight stacks in one simple operation, the stacking operation need not be interrupted for any material period of time.

With the preferred embodiment, blending of the bricks in the stacks is automatically achieved since each row in a given stack is from a different grid. Additional blending can also be achieved by the operator of the gripper transfer since he can successively remove grids from different stacks on the two kiln cars to insure a high degree of blending.

Although a preferred embodiment of this invention is illustrated, it is to be understood that various modifications and rearrangements of parts may be resorted to without departing from the scope of the invention disclosed and claimed herein.

I claim:

1. A brick handling machine for unloading kiln cars having stacks of grids thereon wherein each grid includes parallel lines of endwise abutting brick comprising a stacker, conveyor means, spreader means, and gripper transfer means, said gripper transfer means operating to simultaneously grip an entire grid at said kiln car and transfer such grid to said spreader means, said spreader means operating to separate the bricks in each grid into a plurality of spaced rows of laterally abutting brick and deliver such rows to said conveyor means, said conveyor means operating to deliver said spaced rows to a gripping position at said stacker, said stacker operating to simultaneously grip a group of abutting brick in each parallel row and sequentially position each group on top of a preceding corresponding group and thereby simultaneously form a stack of groups corresponding to each row, said stacker subsequently operating to simultaneously deliver said stacks to a subsequent processing system thereby clearing said stacker for the formation of subsequent stacks.

2. A brick handing machine as set forth in claim 1 wherein each grid includes parallel lines of superposed pairs of brick resting one on another, and said spreader means is operable to separate the upper and lower brick of each pair and form spaced parallel rows of upper brick and spaced parallel rows of lower brick.

3. A brick handling machine as set forth in claim 2 wherein said spreader means operates through a cycle of operation in which an entire grid is processed during each cycle of operation.

4. A brick handling machine as set forth in claim 3 wherein the number of bricks simultaneously gripped by said stacker is at least substantially equal to the number of bricks contained in each grid.

5. A brick handling machine as set forth in claim 1 wherein each stack contains only one group of brick from each grid.

6. A brick handling machine for unloading kiln cars having stacks of grids thereon wherein each grid includes a plurality of laterally aligned superposed pairs of brick with one brick of each pair resting on the other comprising a stacker, a spreader, and a gripper transfer, said gripper transfer being operable to simultaneously grip all of the bricks in a grid and transfer such grid to said spreader with the bricks in each row abutting, said spreader operating to separate said rows including the associated upper and lower rows and deliver each row in a spaced and parallel relationship with respect to the other rows to said stacker, said stacker operating to simultaneously grip groups of brick from each row and simultaneously form a number of stacks equal to the number of rows, each stack containing only one group of brick from each grid.

7. A brick handling machine as set forth in claim 6 wherein said spreader operates to simultaneously grip all of the upper bricks of a grid and laterally transfer such upper bricks into rows parallel to the rows of lower bricks.

8. A brick handling machine as set forth in claim 7 wherein said superposed rows are separated prior to removal of the upper bricks of each grid and the upper bricks in each grid are transferred while maintaining separation between adjacent rows.

9. A brick handling machine as set forth in claim 6 wherein said stacker includes a stacker carriage movable between a gripping position and a release position in a direction aligned with said rows, a plurality of parallel elongated inflatable grippers operable when inflated and when said carriage is in said gripping position to simultaneously grip the ends of a group of brick in each row with each group containing a predetermined number of brick, said grippers being deflatable when said carriage is in said release position to release said groups and form a plurality of stacks of brick with one stack formed from the bricks of each row.

10. A brick handling machine as set forth in claim 9 wherein each gripper is a flexible tube having a lateral width when deflated less than the spacing between adjacent rows, at least some of said tubes when inflated gripping an adjacent group on each side thereof.

11. A brick handling machine as set forth in claim 6 wherein said stacker includes a vertically movable stacker plate on which a plurality of stacks are simultaneously formed, and means are provided to simultaneously remove said plurality of stacks from said stacker plate so that subsequent stacks can be formed on said plate.

12. A brick handling machine as set forth in claim 11 wherein said last named means includes a pusher plate, said stacker plate and pusher plate being powered for relative horizontal movement to simultaneously slide said stacks off said stacker plate.

13. A brick handling machine as set forth in claim 12 wherein said stacker plate is horizontally movable back and forth past said pusher plate, and pusher plate is vertically movable to permit said stacker plate with stacks of brick thereon to move past said pusher plate and thereafter drop down into a position in alignment with stacks carried by said stacker plate.

14. A brick handling machine as set forth in claim 13 wherein said pusher plate is horizontally movable to push a plurality of stacks to a subsequent processing machine.

15. A brick handling machine as set forth in claim 11 wherein said stacks are spaced from each other when initially formed and are moved into abutting relationship as they are removed from said stacker plate.

16. A brick handling machine as set forth in claim 15 wherein separator sheets are positioned between corresponding groups of brick in said stacks, each separator sheet extending between a plurality of stacks and including a folding portion which folds when said stacks move into abutting relationship.

* * * * *